April 16, 1968     W. CLAYTON     3,378,036
SNUBBER DEVICE
Filed June 1, 1965     2 Sheets-Sheet 1
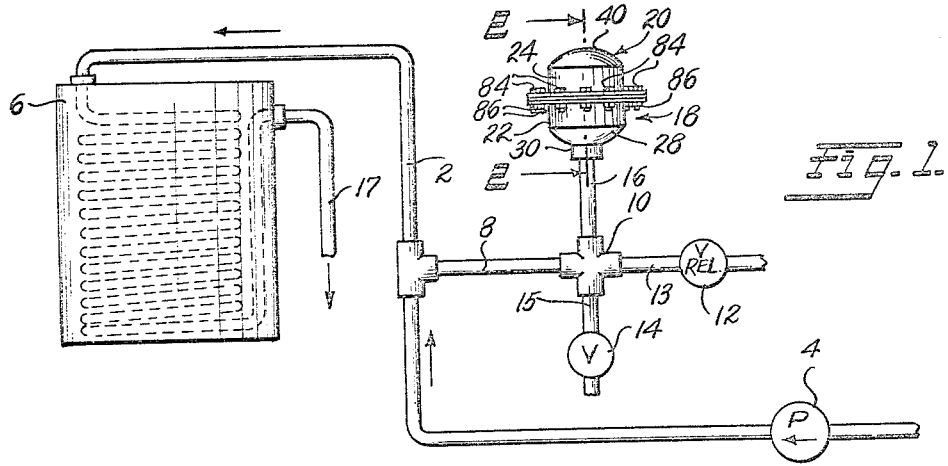
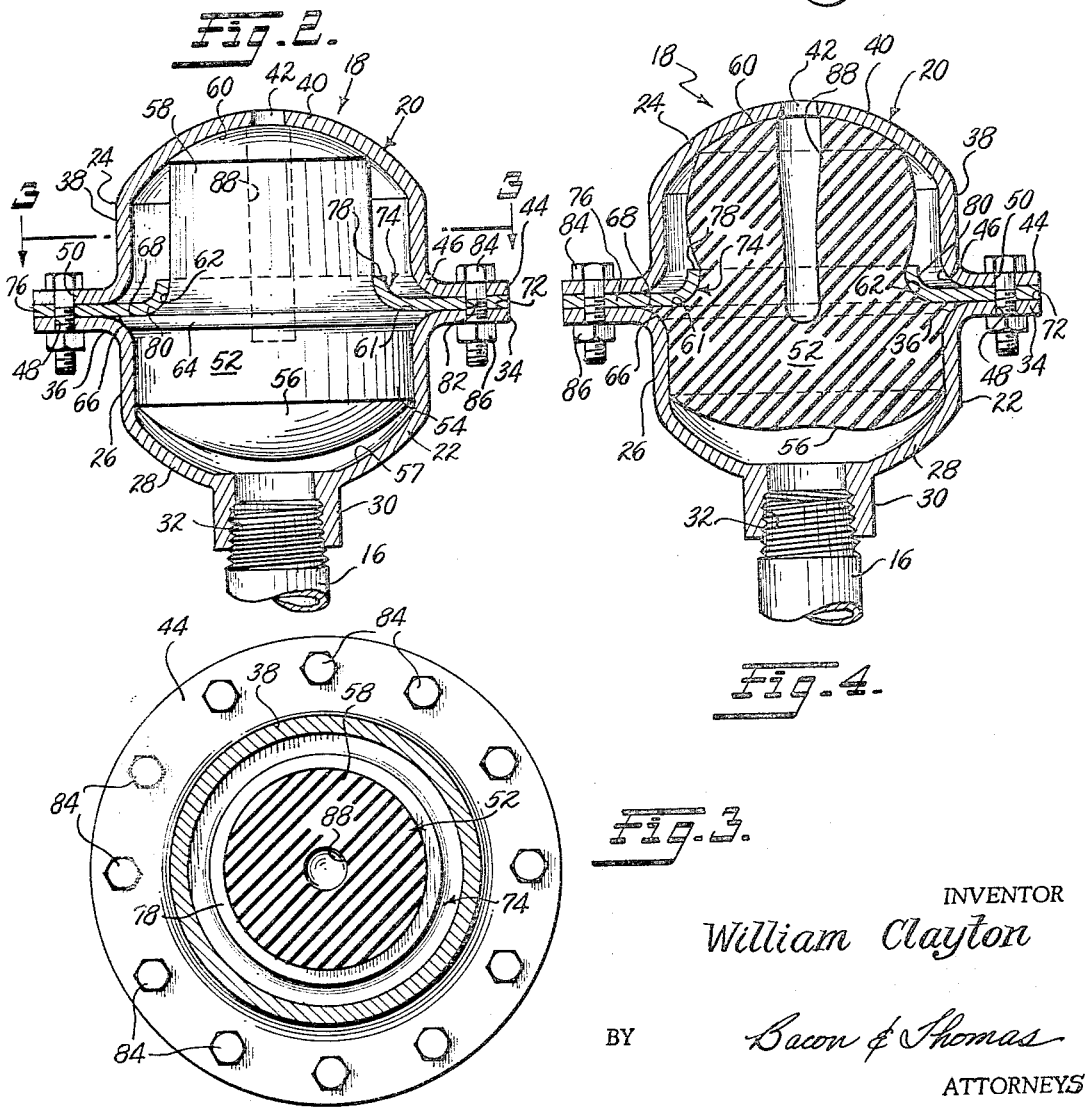
INVENTOR
William Clayton
BY Bacon & Thomas
ATTORNEYS

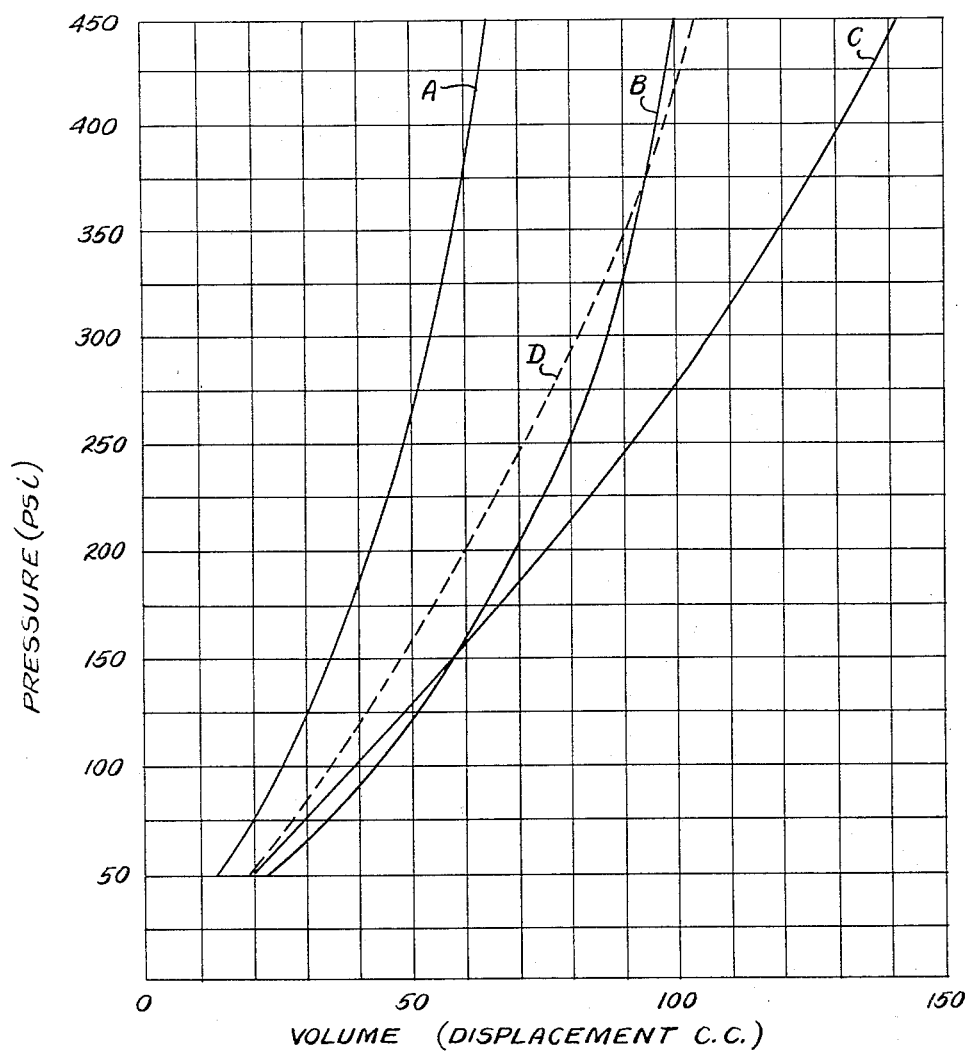

United States Patent Office 3,378,036
Patented Apr. 16, 1968

3,378,036
SNUBBER DEVICE
William Clayton, Pasadena, Calif., assignor to Clayton Manufacturing Company, El Monte, Calif., a corporation of California
Filed June 1, 1965, Ser. No. 460,297
22 Claims. (Cl. 138—30)

ABSTRACT OF THE DISCLOSURE

Snubber for damping rapid pump pulsations comprising upper and lower housing sections, each having a cylindrical side wall portion and a convex end wall with a ring clamped between the sections and extending inwardly beyond the side walls to provide an abutment for a vulcanized rubber core. The core has a shoulder engaging the abutment and an upper cylindrical portion extending through the abutment on one side thereof in spaced relation to the side wall of said upper housing section and into engagement with the end wall of the upper housing section; and a lower cylindrical portion on the other side of the abutment of substantially the same diameter as the lower housing section. The lower housing section has an inlet for liquid, and the lower end of the core is spaced from said inlet to provide a surge chamber.

---

This invention relates generally to snubbers, and more particularly to a snubber device designed to be connected in a fluid system to cushion or dampen rapid pump pulsations, or sudden surges, in the liquid being pumped into the system.

More specifically, the invention relates to an improved snubber device including a housing and a uniquely shaped non-metallic core or body of resilient material mounted in the housing so that a portion thereof is exposed to the pressure surges or pump pulsations in the pipeline or system with which the snubber housing is connected. The invention utilizes the principle of vulcanized natural rubber being substantially incompressable and, therefore, subject to "flow" or displacement in response to the application of force thereto. Hence, the resilient core or body is preferably made of natural rubber compounded to a preselected Shore hardness and designed to "flow" or deform when pressure surges or pulsations in the liquid act thereon, whereby the surges or pulsations are absorbed or dampened by displacement of portions of the resilient body and the possibility of damage to the system or any components connected therewith, is averted.

The present snubber device is an improvement over prior devices designed for similar purposes, but which include a spring-pressed diaphragm, or simply a concavo-convex resilient disc designed to absorb pulsations by flattening out. The spring-pressed type of snubber, while generally satisfactory, is comparatively expensive and the spring ultimately loses its initial resistance to compression. The concavo-convex type of snubber body, while relatively inexpensive, has the disadvantage that after is has been in use for some time, its elasticity becomes impaired and it has a tendency to buckle or snap-over in the manner of a "Spencer" disc. The present snubber device is much less expensive than the spring-pressed type, and is not subject to the undesirable characteristics of the concavo-convex disc snubber, and it longer-lived than both.

The present snubber device is of general utility, although especially well adapted for use in a steam cleaner of the type disclosed, for example, in Arant Patent No. 2,755,130, wherein a positive displacement pump operates continuously to pump liquid to a heating coil, the liquid being heated and discharged through a nozzle when the device is in use to perform a cleaning operation, or pumped and by-passed when the nozzle is shut off. The Arant patent discloses a spring-pressed diaphragm type of snubber over which the present snubber device is an economical and mechanical improvement.

Another feature of the present snubber device is that it lends itself to a wide operating range of pressures and volumetric displacement requirements through the different operating characteristics that can be achieved by making the resilient core or body of a predetermined Shore hardness. Thus, the housing can be of fixed design and resilient cores of different Shore hardness mounted therein to meet given installation requirements for ideal results.

The principal object of the invention is to provide a snubber device for a fluid line or system designed to cushion or dampen rapid pressure surges and pulsations in liquid being pumped into said line or system.

Another object is to provide a snubber device employing a core or body of resilient material mounted within a housing to cushion or dampen pressure surges in a liquid line to which the housing is connected, and which is constructed to withstand rapid and high pressure surges or pulsations of a positive displacement pump without damage or failure.

Still another object is to provide a resilient core for a snubber device of the type described, designed so that portions thereof can be axially and laterally deformed or displaced under pulse pressure and recover their original configuration when the pressure is relieved and not take a substantial permanent set.

Another object is to provide a housing for a snubber device designed to receive a resilient core member of a given Shore hardness to meet a particular range of operating pressure conditions.

A still further object is to provide a snubber device which has few parts, is economical and easy to manufacture, and has a long life expectancy.

Ohter objects and many of the attendant advantages of the present invention will become readily apparent from the following detailed description, when taken in connection with the accompanying drawings, wherein:

FIG. 1 is a diagrammatic view of a liquid heating system incorporating the snubber device of the present invention;

FIG. 2 is a vertical sectional view, taken generally along the line 2—2 of FIG. 1, showing the upper and lower sections of the snubber housing and the retaining ring in cross-section, and the resilient body in elevation;

FIG. 3 is a horizontal sectional view through the upper housing section, taken along the line 3—3 of FIG. 2;

FIG. 4 is a view similar to FIG. 2, but with the resilient core shown in cross-section and as it appears when an impulse or surge pressure is applied thereto, causing it to "flow" or deform; and FIG. 5 is a graph showing the displacement properties of three resilient core members of different Shore hardness compared with the characteristics of a spring coil type of snubber.

Referring now to the drawings, an example of a fluid system of the kind in which the present snubber device is utilized is schematically shown in FIG. 1 and comprises a pipe or conduit 2 connected at one end to the outlet of a suitable positive displacement pump 4. The other end of the pipe 2 is connected to the inlet of a heating coil 6, which can be a part of a steam cleaner, steam generator, or other apparatus. Leading from the pipe 2 is a branch conduit 8, which is connected to one of the branches of a 4-way fitting 10. The relief valve 12 and a blowdown valve 14 are connected by suitable pipe nipples 13 and 15, respectively, to two other of the branches of fitting 10. The snubber device is generally identified by the numeral 18 and is connected to the remaining branch of the fitting 10 by a pipe nipple 16. A discharge pipe 17 is connected to the outlet of the heating coil 6 and leads to a source of demand.

It will be understood that the heating coil 6 can be heated by any suitable means (not shown).

The snubber device 18 includes a housing 20 comprising upper and lower cup-like sections 24 and 22. The lower housing section 22 includes a cylindrical side wall 26, which merges at its lower extremity into a dome-shaped end wall 28 having a boss 30 formed centrally thereon and provided with a threaded inlet opening 32 for receiving the upper end of the nipple 16. The upper end of the cylindrical side wall 26 merges into an annular, horizontal flange 34 through a rounded portion 36.

The upper housing section 24 includes a cylindrical side wall 38, which terminates at its upper, or outer end in a dome-shaped end wall 40 having an axial air vent port 42. The lower end of the cylindrical side wall 38 has an annular horizontal flange 44 formed thereon, including a rounded portion 46 which merges into the cylindrical side wall 38. The flanges 34 and 44 have aligned openings 48 and 50, respectively, extending therethrough.

Received within the housing 20 is a unitary core or body 52 molded from resilient material, preferably vulcanized natural rubber. The resilient core 52 includes a lower cylindrical body portion 54 of an external diameter substantially the same as the internal diameter of the cylindrical side wall 26 of the lower housing section 22. The core 52 has an overall axial length substantially less than the axial distance between the end walls 28 and 40 (FIG. 2). The lower cylindrical body portion 54 terminates at its lower end in a partially spherical or convex dome 56 that is spaced from the end wall 28 to form a surge chamber 57 for liquid. The dome 56 provides a large surface area on which the pressure of the liquid can act.

The resilient core 52 also has an upper generally cylindrical body portion 58 of a diameter substantially less than the internal diameter of the cylindrical side wall 38 of the upper housing section 24 within which it is received. The cylindrical portion 58 terminates at its upper end in a partially spherical or convex dome 60, which engages the inner surface of the end wall 40, the dome 60 and the end wall 40 having complementary configurations when the resilient body 52 is in its relaxed, or undistorted, condition as shown in FIG. 2.

The cylindrical portions 58 and 54 of the core 52 are concentric and have an annular horizontal shoulder 61 at their juncture, which merges by a rounded portion 62 with the outer surface of the upper body portion 58. A ridge 64 projects outwardly as an extension of the shoulder 61. The lower surface 66 of the ridge 64 merges into the outer surface of the lower cylindrical portion 54 and is rounded to correspond to the curvature of the rounded portion 36 of the flange 34 and seats thereon. The top surface 68 of the shoulder 61 is annular and flat to provide ample bearing surface for a purpose explained below. The ridge 64 preferably has an initial axial thickness such that when the lower surface 66 thereof is seated on the rounded flange portion 36, the top surface 68 will project slightly above the top surface 72 of the flange 34.

A retainer ring 74 is received over the generally cylindrical upper portion 58 of the resilient core 52, and includes a horizontal annular portion 76, a short axial cylindrical portion 78, and a rounded portion 80 interconnecting the portions 76 and 78. The rounded portion 80 of the ring 74 corresponds in shape to the rounded portion 62 of the core 52, and the portions 78 extends axially for a short distance along the generally cylindrical portion 58 of said core. The upper body portion 58 may be made truly cylindrical, but is preferably formed with a slight inward taper from the rounded portion 62 to its dome end 60, say about two degrees. Such taper facilitates inserting the portion 58 through the ring 74.

The ring 74 has an outer diameter corresponding to the outer diameter of flanges 34 and 44 of the housing sections 22 and 24, and is provided with openings 82 aligned with the openings 48 and 50 in said flanges. The ring 74 is sandwiched between the flanges 34 and 44 and all three are secured together by bolts 84 and nuts 86. Thus, the ridge 64 on the resilient core 52 is clamped between the ring 74 and the lower housing section 22. When the bolts 84 and nuts 86 are tightened, the ridge 64 will be compressed between the annular portion 76 of the ring 74 and the rounded portion 36 of the flange 34, thereby forming an effective seal to prevent leakage of liquid from the damping chamber 57 in the housing section 22 into the upper housing section 24.

The resilient body 52 has a cylindrical recess 88 extending thereinto from the crest of the dome 60 to a point below the level of the ridge 64. The recess 88 is formed by a heated element (not shown) employed to facilitate curing of the rubber during molding. However, the recess 88 serves the useful purpose of accommodating displacement-flow of the core material, as will appear hereinafter.

The convex dome configuration for the lower end face 56 of the resilient core 52 provides a larger surface area upon which fluid pressure can act than would a flat, end surface. Moreover, the dome-shaped end surface 56 is not subject to a snapover effect, and hence there is no problem of the return of the resilient body 52 to its original configuration after a displacement-causing liquid pressure pulse applied thereto has subsided.

FIG. 2 illustrates the resilient core 52 in its initial, undistorted condition. It will be noted that the dome surface 60 is engaged with the inner surface of the end wall 40 of the upper housing section 24. When liquid under pressure is forced into the system by the positive displacement pump 4, it will enter the damping chamber 57 in the lower housing section 22 through the branch pipe 8 and pipe nipple 16 and will act upwardly upon the dome surface 56. The hydraulic presure exerted on the dome 56 will produce compressive forces that cause the material of the core 52 at its outer periphery to tend to expand laterally and tightly engage the inner surface of the side wall 26 of the lower housing section 28, and also cause portions thereof to be displaced axially so that the material is deformed in the manner shown in FIG. 4. Thus, it will be seen that the dome 56 is distorted upwardly to displace portions of the core material through the opening in the retaining ring 74, thereby causing flow of said core material into the upper housing section 24. In other words, the volume of the core material displaced from the lower housing section 22 results in a corresponding volume of core material being displaced in the upper housing section 24.

The flanges 34, 44, ring 74, and the ridge 64 cooperate to effectively divide the resilient body 52 into the portions 54 and 58, so that the lower body portion 54 is restrained by side wall 26 against lateral displacement but is free to distort axially under fluid pressure; whereas the upper body portion 58 is restrained by the end wall 40 against axial distortion but is free at its outer periphery to distort laterally by expanding in the upper housing section 24. When the lower body portion 54 distorts, it will be seen that a change in the volume of the space between the dome 56 and the end wall 28 of the lower housing section 22 will occur, this change in volume is called the displacement volume, and its value is related to the value of the liquid presure applied to the resilient body 52 and to the resilient characteristics of said body. A corresponding decrease in volume is effected in the unoccupied space in the upper housing section 24 by lateral expansion of the upper body portion 58 and inward displacement thereof in the region of the recess 88, as illustrated in FIG. 4.

When pump pressure surges or pulsations occur in the pipeline 2 of FIG. 1, the pressure will rise and fall rythmically within the chamber 57 in the lower housing section 22 of the snubber device 18. Such rise in pressure will cause the resilient body 52 to rapidly distort in the manner described above, thus increasing the volume of the available space in the chamber 57 in the lower housing section 22 between the end wall 28 and the dome 56. The increased volume thus resulting within the lower housing section 22 readily absorbs the pressure surges in the pipe 22, and effects damping or cushioning thereof. During the interval between the pressure surges or pulsations, the inherent resilience of the material of the body 52 will cause said body to return as nearly to its original condition as the back-pressure in pipe 2 will permit.

The displacement volume occuring in the lower housing section 22, as a result of pulse pressure being applied to the dome 56, depends upon the Shore hardness of the resilient core or body 52. Thus, referring to FIG. 5, it has been found that the curve resulting from the plotting of displacement volume in cubic centimeters (cc.) against applied liquid pressure in pounds per square inch (p.s.i.) for a resilient core 52 made of natural rubber is not a straight line, and furthermore, will vary depending upon the Shore hardness of the material. For example, the curve A shows the volumetric displacement of the resilient core 52 in cubic centimeters under various pressure conditions, when made of natural rubber with a Shore hardnes of 83. Curve B corresponds to that of a similar core but having a lower Shore hardness of 76. Curve C corresponds to a similar core having a still lower Shore hardness of 60.

It will be apparent from a comparison of the curves A, B and C, that the volumetric displacement of the core material under various pressure conditions increases as the hardness of the natural rubber is decreased. Thus, for a pressure range of 50 to 450 p.s.i., the volumetric displacement of the core 52 with a Shore hardness of 83 (curve A) varied from about 13 to 64 cc.; the core with a 76 Shore hardness (curve B) varied from about 20 to 100 cc.; and a core with a 60 Shore hardness varied from about 22 to 142 cc. Thus, over the range of 60 to 83 Shore hardness, volumetric displacement under the pressure range of 50 to 450 p.s.i. can be varied from a low of 13 to 22 cc. to a high of 64 to 142 cc.

The foregoing values were obtained by tests made with resilient cores 52 having an overall axial length of about 5.94 inches, a lower body portion 54 diameter and length of about 5 inches and 2.63 inches, respectively, and an upper body portion 58 diameter and length of about 3.6 inches and 3.31 inches, respectively. The radius of the dome 56 was 3.44 inches and that of the dome 60 was 3.06 inches. The recess 88 was ¾ of an inch in diameter and 3.83 inches deep. The maximum distance between the housing end walls 28 and 40 was 6.195 inches.

As an instance of comparison, curve D illustrates the characteristics of a comparable spring-pressed diaphragm type snubber having a rate of 16,000 to 19,000 pounds per inch of compression. It will be noted that the volumetric surge chamber displacement of such device is quite close to that obtained with the resilient core of the present invention having a Shore hardness of 76 (curve B).

FIG. 5 readily illustrates that the displacement volume desired for particular operating pressure conditions can be obtained by selecting a resilient body 52 having the desired Shore hardness. This feature of the invention makes it possible to readily adapt the snubber device 18 to meet a wide range of operating conditions.

Obviously, many modifications and variations of the present invention are possible in the light of the above teachings. It is therefore to be understood that within the scope of the appended claims, the invention may be practiced otherwise than as specifically described and illustrated.

I claim:

1. A snubber device, comprising: a hollow housing having an inlet at one end for connection with a pipe subject to pressure pulsations; and a core of resilient, displaceable material within said housing comprising a portion having an end disposed adjacent said inlet and having an outer periphery confined against lateral displacement by the inner surface of said housing but being free to be displaced axially in response to pressure pulsations, and comprising another portion having an end confined against axial displacement and an outer periphery free to be displaced laterally in response to axial displacemet of said first-mentioned portion.

2. A snubber device, comprising: a housing having a generally cylindrical, hollow body closed at its opposite ends by end walls, one of said end walls having means thereon for connecting said housing to a fluid line subject to pressure pulsations; a core of resilient, displaceable material disposed within said housing, and having an axial length substantially less than the distance measured between said end walls, and means disposed approximately medially of said housing body securing said resilient core therein with one end of said resilient core in engagement with the other end wall of said housing, the portion of said resilient core between said securing means and said other end wall being generally cylindrical and substantially smaller in diameter than the portion of said housing within which it is received and the portion of said core between said securing means and said other end wall of said housing being generally cylindrical and of substantially the same diameter as the portion of the housing in which it is received.

3. A snubber device as recited in claim 2, wherein the securing means includes an annular abutment carried by and projecting inwardly into the housing and wherein the resilient core has a shoulder engaged with said abutment.

4. A snubber device as recited in claim 2, wherein said other end wall of the housing has a vent port therein.

5. A snubber device as recited in claim 2, wherein the other end of the resilient core has a convex dome shape.

6. A snubber as recited in claim 2, wherein the core of resilient material is natural rubber having a Shore hardness of about 60 to 83.

7. A snubber device, comprising: a housing having a cylindrical side wall, and an upper end wall and a lower end wall at the opposite extremities of said side wall; a core of resilient, displaceable material within said housing; and means in said housing at a point approximately medially of said side wall forming an abutment and being provided with a central opening, said core having an upper body portion of reduced diameter extending through said opening and engaging said upper end wall, said core having a shoulder engaging the lower side of said abutment and having a lower body portion below said shoulder of substantially the same diameter as the inside diameter of said housing, said lower end wall having an inlet opening to admit liquid subject to pulsations into said housing to act on said lower body portion.

8. A snubber device as defined in claim 7, wherein a damping chamber is provided in the housing between the lower end wall of said housing and the adjacent end of the lower body portion.

9. A snubber device as defined in claim 7, wherein the upper body portion is slightly tapered in a direction toward the upper end wall.

10. A snubber device, comprising: a housing having upper and lower hollow, aligned, generally cylindrical sections each closed at its outer end by an end wall; means securing said housing sections together at their inner ends; means on the end wall of the lower housing section for connecting the same with a fluid line subject to pressure pulsations; a core of resilient material disposed within said housing, and having an axial length substantially less than the axial distance between said end walls; means on said resilient core engageable by cooperating means carried by said housing for securing said resilient core within said housing with one end of sad reslient core in engagement with the end wall of said upper housing section, said resilient core including an upper body portion received within and of substantially smaller diameter than said upper housing section.

11. A snubber device as recited in claim 10, wherein said means on said resilient core comprises an annular ridge, and wherein the means for securing the housing sections together includes an annular flange on the inner end of each housing section, at least the flange on said lower housing section being merged therewith by a rounded portion, and wherein the means carried by the housing for securing the resilient core is a retaining ring encircling the upper body portion of said core and extending in between the flanges of said housing sections, said ridge extending to a point between said retaining ring and the rounded portion of the flange on the lower housing section and seating thereon.

12. A snubber device as recited in claim 10, wherein the retaining ring includes a rounded, and a generally cylindrical portion on the inner periphery thereof extending along the upper body portion for a minor portion of the length thereof.

13. A snubber device as recited in claim 10, wherein the outer end of said lower body portion has a convex dome shape.

14. A snubber device as recited in claim 13, wherein the end wall of the lower housing section has a configuration corresponding to said outer end of the lower body portion, and is spaced therefrom to provide a damping chamber.

15. A snubber device as recited in claim 10, wherein the end wall of the upper housing section and the outer end of the upper portion have convex dome-shaped configurations.

16. A snubber device as recited in claim 10, wherein the end wall of the upper housing section has a vent port therein, and wherein the resilient core has an axial recess therein aligned with said vent port.

17. A snubber device, comprising: an upper housing section and a lower housing section, each having a cylindrical side wall, a bottom wall at one end, and an outwardly extending flange at the opposite end, said housing sections being arranged with their flanged ends facing each other; an annular retaining ring having a portion disposed between said flanges and having a central opening of smaller diameter than the inside diameter of the side wall of said upper housing section; means securing said flanges and retaining ring together; a core of resilient, displaceable material having generally cylindrical upper and lower body portions of different diameter and a shoulder at the juncture of said upper and lower body portions, said lower body portion being disposed in said lower housing section and having an outside diameter substantially equal to that of the inside diameter of said side wall of said lower housing section, said upper body portion being disposed in said upper housing section and having an outside diameter substantially smaller than the inside diameter of said upper housing section and extending through the opening in said retaining ring, said shoulder being engaged with the lower side of said retaining ring and the end of said upper body portion being engaged with the inner side of the wall of said upper housing section, the end wall of said upper housing section having a central opening for venting air from said upper housing section, the end wall of said lower housing section having an inlet opening for connecting the same with a pipe subject to liquid pulsations, said lower body portion having its lower end spaced from the end wall of said lower housing section to provide a damping chamber communicating with said inlet opening.

18. For use in a snubber device of the character described, an integral body of resilient, displaceable material, comprising: a first generally cylindrical body portion terminating in an end face having a convex dome shape; a second generally cylindrical body portion extending from and of substantially smaller diameter than said first body portion; an annular shoulder at the juncture of said first and second body portions; and a ridge projecting outwardly from said first body portion at said shoulder.

19. An integral resilient body as recited in claim 18, wherein both body portions terminate in an end face having a convex dome shape.

20. An integral resilient body as recited in claim 19, wherein said body is molded from natural rubber and has a Shore hardness in the range of 60 to 83.

21. An integral resilient body, as recited in claim 18, wherein the first generally cylindrical body portion has a recess extending inwardly from its convex end face.

22. An integral resilient body, as recited in claim 21, wherein the recess extends to a depth approximately in the plane of the ridge.

References Cited

UNITED STATES PATENTS

| 2,300,722 | 11/1942 | Adams et al. | 138—30 |
| 2,755,820 | 7/1956 | Taylor | 138—26 |

FOREIGN PATENTS

| 104,257 | 6/1938 | Great Britain. |

LAVERNE D. GEIGER, *Primary Examiner.*

B. E. KILE, *Assistant Examiner.*